(12) United States Patent
Beaulieu et al.

(10) Patent No.: US 8,862,532 B2
(45) Date of Patent: Oct. 14, 2014

(54) DISPLAYING INFORMATION ASSOCIATED WITH AN OPERATION STATE OF A BUILDING

(75) Inventors: Conrad B. Beaulieu, Duluth, MN (US); Henry Chen, Beijing (CN); Cheng Jun Li, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 13/407,338

(22) Filed: Feb. 28, 2012

(65) Prior Publication Data

US 2013/0226853 A1  Aug. 29, 2013

(51) Int. Cl.
G06F 17/00 (2006.01)
G06N 5/02 (2006.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| | | |
|---|---|---|
| 6,839,850 B1 | 1/2005 | Campbell et al. |
| 7,027,055 B2 | 4/2006 | Anderson et al. |
| 7,716,012 B2 | 5/2010 | Bickel |
| 8,000,911 B2 | 8/2011 | Carter et al. |
| 2006/0277501 A1 | 12/2006 | Plocher et al. |
| 2007/0107371 A1 | 5/2007 | Plocher et al. |
| 2007/0257937 A1 | 11/2007 | Rye et al. |
| 2008/0177510 A1 | 7/2008 | Jin et al. |
| 2009/0125825 A1 | 5/2009 | Rye et al. |
| 2009/0307255 A1 | 12/2009 | Park |
| 2010/0318929 A1 | 12/2010 | Hilton et al. |
| 2011/0047418 A1* | 2/2011 | Drees et al. ............... 714/57 |
| 2013/0085588 A1 | 4/2013 | Brun et al. |

OTHER PUBLICATIONS

L. Deligiannidis, et al., "Event Visualization in a 3D Environment", Human System Interactions, May 25-27, 2008, Krakow, Poland, (7 pgs.).
Umi Laili Yuhana, et al., "An Ontology Based Approach for Searching Neighborhood Building", Computer Science and Information Engineering Department, National Taiwan University, 2007 (p. 106-112).
Artur Krukowski, et al. Comprehensive Building Information Management System Approach. International Journal of Simulation Systems, Science & Technology, vol. 11, No. 3, pp. 12-28, May 2010.
Andreas Fernbach, et al. Interoperability at the Management Level of Building Automation Systems: A Case Study for BACnet and OPC UA, IEEE ETFA. pp. 1-8. 2011.

* cited by examiner

*Primary Examiner* — Michael B Holmes
(74) *Attorney, Agent, or Firm* — Brooks, Cameron & Huebsch, PLLC

(57) ABSTRACT

Devices, methods, and systems for displaying information associated with an operation state of a building are described herein. One method includes defining a rule condition for a building, wherein the rule condition is based on an ontology definition associated with the building, generating, upon a triggering of the rule condition, analytic information associated with the triggered rule condition, wherein the analytic information is based on the ontology definition, and displaying the analytic information associated with the triggered rule condition as part of a display of an operational environment of the building.

21 Claims, 3 Drawing Sheets

DISPLAYING INFORMATION ASSOCIATED WITH AN OPERATION STATE OF A BUILDING

TECHNICAL FIELD

The present disclosure relates to devices, methods, and systems for displaying information associated with an operation state of a building.

BACKGROUND

A building management system, such as, for example, a facility management system, energy management system, and/or security management system, among other types of management systems, can be used to manage, control, and/or monitor a building. For example, a building management system can display information (e.g., data) associated with an operation state of a building to a user (e.g., operator and/or control engineer) of the building management system. For instance, a building management system can display operational data of components (e.g., objects, control components, equipment, devices, networks, areas, and/or spaces) of the building.

Previous approaches of displaying the information associated with the operation state of a building, however, can be complex and/or difficult for the user to understand. For example, many different seemingly unrelated or invisible conditions may exist in a building, but because previous display approaches may focus only on one item (e.g., one piece of equipment in the building, one area of a building, or one stream of text messages indicating a single fault in the building), the user may not be able to see or process them. Further, previous approaches may display information in an abstract manner (e.g., the information may be displayed away from and/or separate from a display or map of the building). That is, the information may be displayed without any context. Accordingly, it may be difficult for the user to synthesize the information (e.g., it may be difficult for the user to visualize the information in his or her mind) and take the appropriate action.

DETAILED DESCRIPTION

Figure 1:
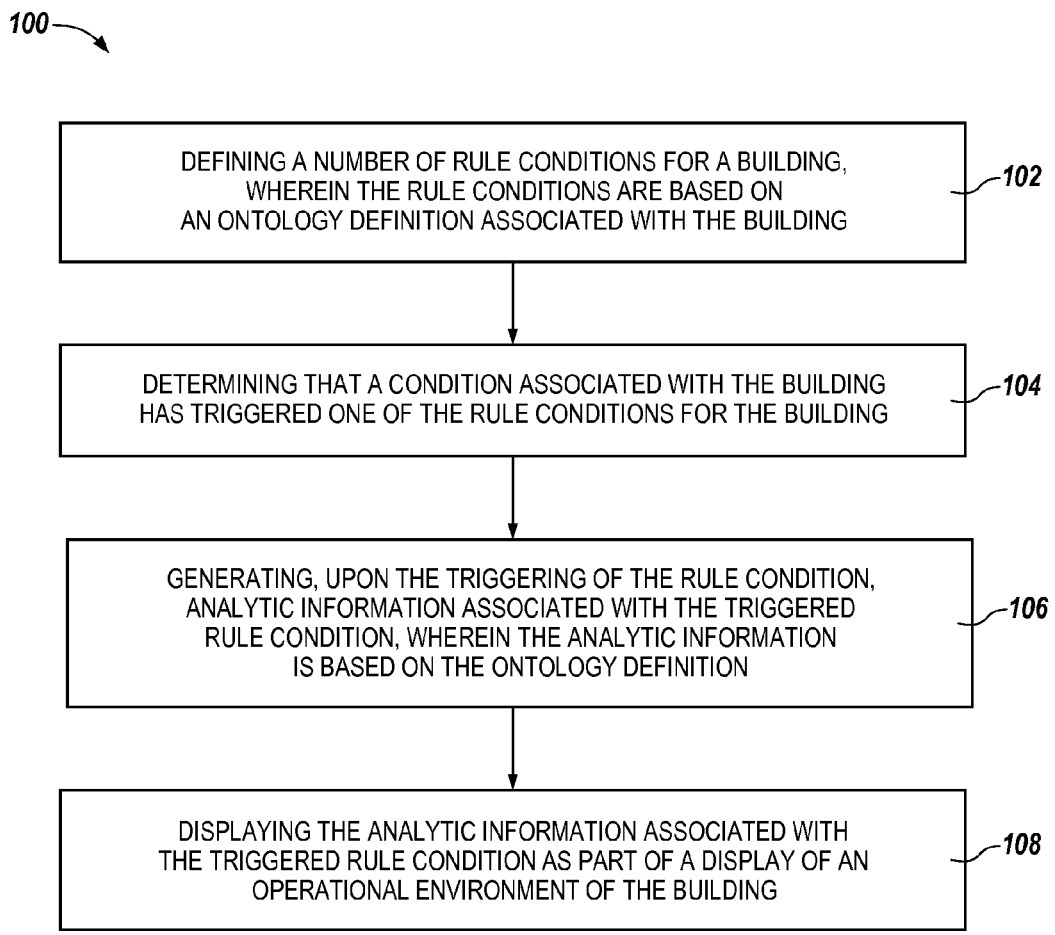
FIG. 1 illustrates a method for displaying information associated with an operation state of a building in accordance with one or more embodiments of the present disclosure.

Devices, methods, and systems for displaying information associated with an operation state of a building are described herein. For example, one or more embodiments include defining a rule condition for a building, wherein the rule condition is based on an ontology definition associated with the building, generating, upon a triggering of the rule condition, analytic information associated with the triggered rule condition, wherein the analytic information is based on the ontology definition, and displaying the analytic information associated with the triggered rule condition as part of a display of an operational environment of the building.

Embodiments of the present disclosure can display the information associated with the operation state of a building in a simple, easy to understand manner. For example, embodiments of the present disclosure can provide a context for and visualize the information in a manner such that a user (e.g., an operator and/or control engineer) can take advantage of the information (e.g., the information may be displayed as part of a display or map of the building). That is, embodiments of the present disclosure can display the information to the user in a meaningful, intelligent, intuitive manner, thereby enabling the user to easily synthesize the information and take the appropriate action.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of rule conditions" can refer to one or more rule conditions.

FIG. 1 illustrates a method 100 for displaying information (e.g., data) associated with an operation state of a building in accordance with one or more embodiments of the present disclosure. Method 100 can be performed, for example, by system 201 (e.g., computing device 220 and/or rule engine 230) described in connection with FIG. 2.

The information can be displayed, for example, to a user (e.g., operator and/or control engineer) of a management system of the building, such as, for instance, a facility management system, energy management system, and/or security management system of the building. The displayed information can include, for example, operational data of components (e.g., objects, control components, equipment, devices, networks, areas, and/or spaces) of the building, as will be further described herein.

At block 102, method 100 includes defining a number of rule conditions for a building, wherein the rule conditions are based on an ontology definition associated with the building. The rule conditions can, for example, be rule conditions for the operational conditions of the building (e.g., the operational conditions of components of the building). For instance, the rule conditions can include temperature rule conditions for an area (e.g., zone) of the building, such as whether the temperature in the area of the building is outside of a particular temperature range (e.g., for a particular period of time, such as 15 minutes), and/or whether the temperature in the area in the building has not changed more than a particular amount (e.g., 0.1 degrees) in a particular period of time (e.g., 24 hours).

The ontology definition associated with the building can be, for example, a meta-data definition that includes, for example, a naming convention of the components of the building, attributes of the components of the building, and/or relationships between the components of the building. That is, an ontology can define, at a minimum, the name of a class or concept, the properties and/or attributes of the class, and/or its relations with other classes. The relationships may also have properties.

At block 104, method 100 includes determining that a condition (e.g., an operational condition) associated with the building (e.g., a component of the building) has triggered one of the rule conditions for the building. For example, if the rule conditions include the temperature rule conditions for an area of the building previously described herein, a determination (e.g., a measurement by a temperature sensor) that the temperature of the area of the building is outside of the particular temperature range or has not changed more than the particular amount in the particular period of time would trigger those respective rule conditions.

At block 106, method 100 includes generating, upon the triggering of the rule condition (e.g., upon determining that the condition associated with the building has triggered the rule condition) analytic information associated with the triggered rule condition, wherein the analytic information is based on the ontology definition associated with the building. As an example, a mathematical algorithm can generate the analytic information associated with the triggered rule condition based on the condition associated with the building that triggered the rule condition and the ontology definition.

The analytic information associated with the triggered rule condition can include temporal information associated with the triggered rule condition (e.g., the condition associated with the building that triggered the rule condition over time) and/or spatial information associated with the triggered rule condition (e.g., a floor plan of the building and/or information associated with a connection relationship between components of the building). For example, the analytic information can include weather conditions associated with (e.g., outside of) the building (e.g., at the time and/or before the rule condition is triggered), electrical demand associated with the building (e.g., of components of the building), a status of control setpoints (e.g., temperature setpoints) of the building, a temperature of a zone in the building, and/or an occupancy schedule for the building (e.g., an area of the building).

As an additional example, if the triggered rule condition is a temperature rule condition for an area of the building (e.g., one of the temperature rule conditions for an area of the building previously described herein), the analytic information associated with the triggered rule condition can include the floor plan of the area of the building (e.g., the floor plan of the building can be zoomed in to the area of the building), the temperature sensors in the area of the building, a color coded temperature map of the area of the building, the temperature setpoint of the area of the building, a chart that displays the temperature in the area of the building over time, and/or a chart that displays the air temperature of equipment (e.g., a variable air volume (VAV) damper or air handling unit (AHU)) that supplies air to the area of the building over time.

In some embodiments, the analytic information associated with the triggered rule condition can include a cost (e.g., a monetary cost) associated with the triggered rule condition. That is, the triggered rule condition can be monetized. In some embodiments, an importance of the analytic information can be determined, as will be further described herein.

At block 108, method 100 includes displaying the analytic information associated with the triggered rule condition as part of (e.g., in situ with and/or overlaid on) a display of an operational environment (e.g., room, space, area, etc.) of the building. For example, the analytic information associated with the triggered rule condition can be displayed to a user (e.g., operator and/or control engineer) of a management system of the building as part of a display of an operational environment of the building provided to the user.

The display of the operational environment can include, for example, an architectural layout (e.g., floor plan) of the operational environment, the equipment in the operational environment, and/or an information panel that displays the analytic information associated with the triggered rule condition. The display can be, for example, a two-dimensional or three-dimensional display.

As an example, the display of the analytic information associated with the triggered rule condition can include a display (e.g., replay, range, and/or view) of the temporal information associated with the triggered rule condition as a trend in the spatial information associated with the triggered rule condition. For instance, the temporal information associated with the triggered rule condition can be displayed as a chart (e.g., graph) that displays the condition associated with the building that triggered the rule condition over time.

In some embodiments, the display of the operational environment of the building can isolate components of the building associated with the triggered rule condition. For example, the display can highlight the components of the building associated with the triggered rule condition, or display only the components of the building associated with the triggered rule condition (e.g., not display components of the building that are not associated with the triggered rule condition).

In embodiments in which the importance of the analytic information associated with the triggered rule condition is determined, the importance of the analytic information can be displayed as part of the display of the operational environment of the building. That is, the display of the analytic information associated with the triggered rule condition can be based on the importance of the analytic information associated with the triggered rule condition. For example, the analytic information determined to be most important can be displayed most prominently in the display of the operational environment of the building.

In some embodiments, the ontology (e.g., meta-data) definition associated with the components of the building included in the display of the operational environment of the building and the analytic information associated with the triggered rule condition can determine what information (e.g., what analytic information) is displayed and how it is displayed. For example, meta-data associated with the possible conditions of the components of the building (e.g., equipment, areas, and/or spaces of the building) can be displayed. Accordingly, visual clues in the display could provide the user with immediate feedback on operational changes occurring in the building.

For example, the color of a displayed component of the building changing (e.g., turning yellow or green) can indicate that a fault is present. As an additional example, a small colored and circled number floating above a displayed component can indicate the number and severity of detected faults. Other condition criteria could also be indicated by the same or similar means but using different analytic filters to adjust the meaning and/or context of what is being displayed.

An example of a display of analytic information associated with a triggered rule condition as part of a display of an operational environment of a building will be further described herein. For example, an example of such a display will be further described in connection with FIG. 3.

Figure 2:
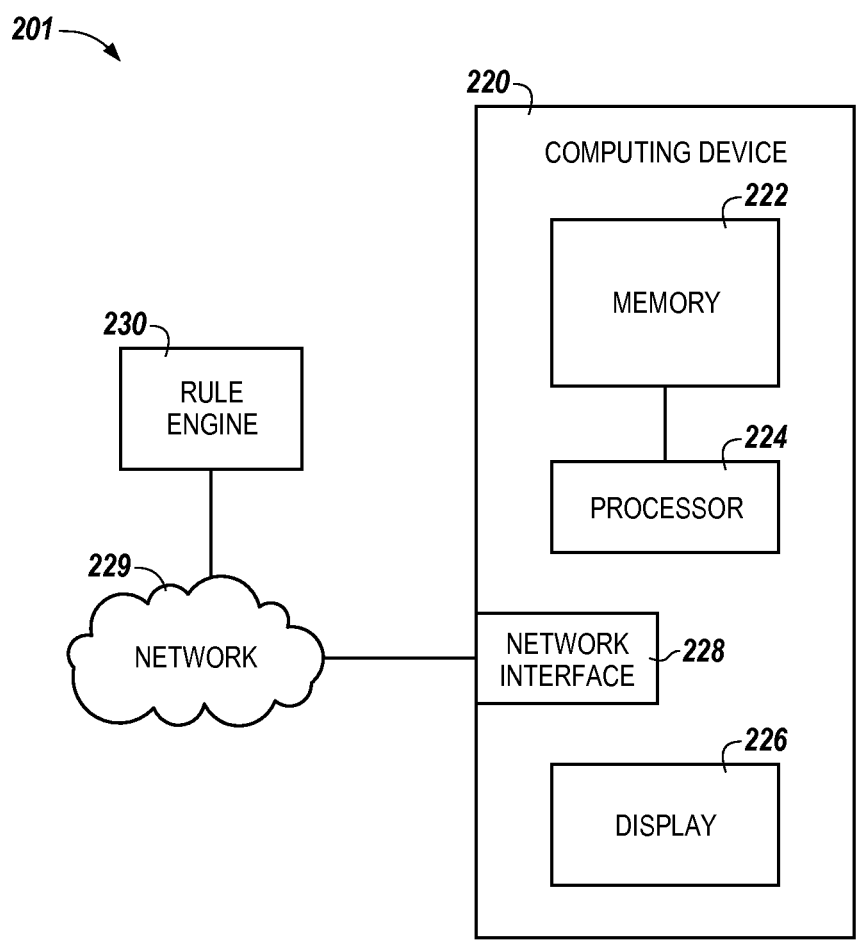
FIG. 2 illustrates a system for displaying information associated with an operation state of a building in accordance with one or more embodiments of the present disclosure.

FIG. 2 illustrates a system 201 for displaying information associated with an operation state of a building in accordance with one or more embodiments of the present disclosure. As shown in FIG. 2, system 201 includes a computing device 220 and a rule engine 230. Although rule engine 230 is illustrated as being separate from computing device 220, embodiments of the present disclosure are not so limited. For example, in some embodiments, rule engine 230 can be located in (e.g., a part of) computing device 220.

Computing device 220 and rule engine 230 can be coupled (e.g., communicate) via a network 229, as illustrated in FIG. 2. Network 229 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 229) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 229 can tie a number of computing devices together to form a distributed control network (e.g., permit a mobile device to connect to a server that connects with a building management system).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Computing device 220 can be, for example, a laptop computer, a desktop computer, or a mobile device (e.g., a mobile phone, a personal digital assistant, etc.), among other types of computing devices. As shown in FIG. 2, computing device 220 can include a memory 222 and a processor 224 coupled to memory 222. Memory 222 can be any type of storage medium that can be accessed by processor 224 to perform various examples of the present disclosure. For example, memory 222 can be a non-transitory computer readable medium having computer readable instructions (e.g., computer program instructions) stored thereon that are executable by processor 224 to perform various examples of the present disclosure.

Memory 222 can be volatile or nonvolatile memory. Memory 222 can also be removable (e.g., portable) memory, or non-removable (e.g., internal) memory. For example, memory 222 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 222 is illustrated as being located in computing device 220, embodiments of the present disclosure are not so limited. For example, memory 222 can also be located internal to another computing resource (e.g., enabling computer readable instructions to be downloaded over the Internet or another wired or wireless connection).

As shown in FIG. 2, computing device 220 includes a network interface 228. Network interface 228 can connect computing device 220 to a network, such as network 229 illustrated in FIG. 2.

As shown in FIG. 2, computing device 220 also includes a display 226. Display 226 can include, for example, a screen that can provide (e.g., display and/or present) information to a user of computing device 220. The user can be, for example, an operator and/or control engineer of a building management system.

Additionally, computing device 220 can receive information from the user of computing device 220 through an interaction with the user via display 226. For example, computing device 220 can receive input from the user via display 226. The user can enter the input into computing device 220 using, for instance, a mouse and/or keyboard associated with computing device 220 (e.g., display 226), or by touching display 226 in embodiments in which display 226 includes touch-screen capabilities (e.g., embodiments in which the screen of display 226 is a touch-screen).

Rule engine 230 can include (e.g., store) a number of rule conditions for a building. The rule conditions can be analogous to the rule conditions previously described herein. For example, the rule conditions can be based on an ontology definition associated with the building, as previously described herein.

Rule engine 230 can determine that one of the rule conditions in rule engine 230 has been triggered (e.g., by a condition associated with the building), in a manner analogous to that previously described herein. For instance, rule engine 230 can determine that the one of the rule conditions has been triggered by interpreting raw data associated with the building (e.g., raw data associated with the condition associated with the building) into the ontology definition associated with the building, and matching the ontology definition against the one of the rule conditions. Upon determining that one of the rule conditions has been triggered, rule engine 230 can provide a notification to computing device 220 (e.g., via network 229) that the rule condition has been triggered.

Upon the triggering of the rule condition (e.g., upon receiving the notification that the rule condition has been triggered from rule engine 230), computing device 220 can generate analytic information associated with the triggered rule condition in a manner analogous to that previously described herein. For example, the analytic information can be based on the ontology definition associated with the building, and can include temporal and/or spatial information associated with the triggered rule condition, as previously described herein.

Computing device 220 (e.g., display 226) can display (e.g., to a user of computing device 220) the analytic information associated with the triggered rule condition in a manner analogous to that previously described herein. For example, computing device 220 (e.g., display 226) can display the analytic information as part of a display of an operation environment of the building, as previously described herein.

Figure 3:
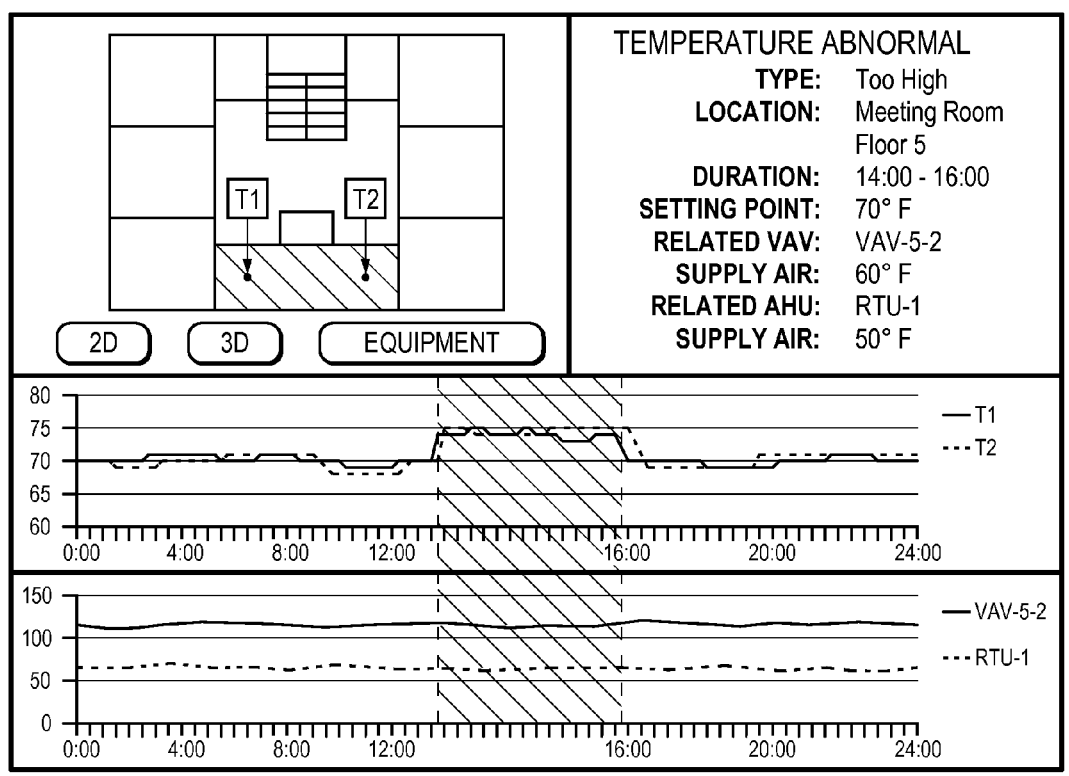
FIG. 3 illustrates an example of a display of information associated with an operation state of a building in accordance with one or more embodiments of the present disclosure.

FIG. 3 illustrates an example of a display 340 of information associated with an operation state of a building in accordance with one or more embodiments of the present disclosure. For instance, display 340 can be an example of analytic information associated with a triggered rule condition displayed as part of a display of an operational environment of a building in accordance with one or more embodiments of the present disclosure. Display 340 can be displayed, for example, by display 226 of computing device 220 previously described in connection with FIG. 2, as previously described herein.

In the example illustrated in FIG. 3, the triggered rule condition is a temperature rule condition for an area of the building (e.g., whether the temperature in the area of the building is outside of a particular temperature range), and the operational environment of the building is a floor (e.g., the fifth floor) of the building. As shown in FIG. 3, display 340 includes a two-dimensional floor plan of the fifth floor of the building. Display 340 could also include a three-dimensional floor plan of the floor and/or equipment on the floor, as indicated by the buttons in the display.

As shown in FIG. 3, the display of the floor plan has isolated (e.g., highlighted) the room of the floor in which the rule condition has been triggered (e.g., the room in which the temperature is outside the particular temperature range). The display also includes the location of temperature sensors (e.g., T1 and T2) in the room, as illustrated in FIG. 3.

As shown in FIG. 3, display 340 also includes an information panel adjacent to the floor plan that displays analytic information associated with the triggered rule condition. In the example illustrated in FIG. 3, the information panel includes a notification that the rule condition has been triggered (e.g., the temperature is abnormal), the type of abnormal temperature that has triggered the rule condition (e.g., a temperature that is higher than the particular temperature range), the area (e.g., location) of where in the building the rule condition has been triggered (e.g., the meeting room on floor 5), the duration (e.g., period of time) for which the rule condition has been triggered (e.g., 14:00-16:00), the temperature setpoint of the room (e.g., 70 F), and the air temperatures (e.g., 60 F and 50 F) of the equipment (e.g., VAV VAV-5-2 and AHU RTU-1, respectively) that supplies air to the room.

As shown in FIG. 3, display 340 also includes charts adjacent to the floor plan and information panel that displays charts (e.g., graphs) of the condition (e.g., temperature) over time. For instance, the example illustrated in FIG. 3 includes a chart that displays the temperature in the room (e.g., the temperature of the two temperature sensors T1 and T2 in the room) over time, and a chart that displays the air temperature of the equipment that supplies air to the room over time. Additionally, the duration during which the rule condition has been triggered is highlighted in the two charts, as illustrated in FIG. 3.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for displaying information associated with an operation state of a building, comprising:
    defining a rule condition for a building, wherein the rule condition is based on an ontology definition associated with the building;
    generating, upon a triggering of the rule condition, analytic information associated with the triggered rule condition, wherein the analytic information is based on the ontology definition and includes at least one of:
        temporal information associated with the triggered rule condition;
        spatial information associated with the triggered rule condition; and
        a cost associated with the triggered rule condition; and
    displaying the analytic information associated with the triggered rule condition as part of a display of an operational environment of the building.

2. The method of claim 1, wherein the ontology definition associated with the building includes at least one of:
    a naming convention of components of the building;
    attributes of components of the building; and
    relationships between components of the building.

3. The method of claim 1, wherein displaying the analytic information associated with the triggered rule condition as part of the display of the operational environment of the building includes overlaying the analytic information associated with the triggered rule condition on the display of the operational environment of the building.

4. The method of claim 1, wherein the display of the operational environment of the building isolates components of the building associated with the triggered rule condition.

5. A system for displaying information associated with an operation state of a building, comprising:
    a rule engine having a number of rule conditions for a building, wherein the rule conditions are based on an ontology definition associated with the building and the rule engine is configured to:
        determine that the one of the rule conditions has been triggered; and
        provide a notification to the computing device that the one of the rule conditions has been triggered; and
    a computing device configured to:
        generate, upon a triggering of one of the rule conditions and upon receiving the notification from the rule engine, analytic information associated with the triggered rule condition, wherein the analytic information is based on the ontology definition; and
        display, to a user of the computing device, the analytic information associated with the triggered rule condition as part of a display of an operational environment of the building provided to the user.

6. The system of claim 5, wherein the rule engine is configured to determine that the one of the rule conditions had been triggered by:
    interpreting raw data associated with the building into the ontology definition associated with the building; and
    matching the ontology definition against the one of the rule conditions.

7. The system of claim 5, wherein the number of rule conditions for the building include a number of temperature rule conditions for an area of the building.

8. The system of claim 7, wherein the number of temperature rule conditions for the area of the building include:
whether a temperature in the area of the building is outside of a particular temperature range; and
whether a temperature in the area of the building has not changed more than a particular amount in a particular period of time.

9. The system of claim 7, wherein the analytic information associated with the triggered rule condition includes:
a floor plan of the area of the building;
temperature sensors in the area of the building;
a color coded temperature map of the area of the building;
a temperature setpoint of the area of the building;
a chart that displays a temperature in the area over time; and
a chart that displays an air temperature of equipment that supplies air to the area over time.

10. The system of claim 5, wherein the computing device is configured to:
determine an importance of the analytic information associated with the triggered rule condition; and
display, to the user of the computing device, the importance of the analytic information associated with the triggered rule condition as part of the display of the operational environment of the building provided to the user.

11. A non-transitory computer readable medium having computer readable instructions stored thereon that are executable by a processor to:
determine that a condition associated with a building has triggered a rule condition for the building, wherein the rule condition is based on an ontology definition associated with the building;
generate, upon determining that the condition associated with the building has triggered the rule condition for the building, analytic information associated with the triggered rule condition, wherein:
the analytic information is based on the ontology definition; and
the analytic information includes temporal and spatial information associated with the triggered rule condition; and
display the analytic information associated with the triggered rule condition as part of a display of an operational environment of the building, wherein the display of the analytic information associated with the triggered rule condition includes a display of the temporal information associated with the triggered rule condition as a trend in the spatial information associated with the triggered rule condition.

12. The computer readable medium of claim 11, wherein the temporal information associated with the triggered rule condition is displayed as a chart that displays the condition associated with the building over time.

13. The computer readable medium of claim 11, wherein the spatial information associated with the triggered rule condition includes:
a floor plan of the building; and
information associated with a connection relationship between components of the building.

14. The computer readable medium of claim 11, wherein the display of the operational environment of the building includes at least one of:
an architectural layout of the operational environment;
equipment in the operational environment; and
an information panel that displays the analytic information associated with the triggered rule condition.

15. The computer readable medium of claim 11, wherein the analytic information associated with the triggered rule condition includes at least one of:
weather conditions associated with the building;
electrical demand associated with the building;
a status of control setpoints of the building;
a temperature of a zone in the building; and
an occupancy schedule for the building.

16. A computer implemented method for displaying information associated with an operation state of a building, comprising:
defining a rule condition for a building, wherein the rule condition is based on an ontology definition associated with the building, wherein the ontology definition associated with the building includes at least one of:
a naming convention of components of the building;
attributes of components of the building; and
relationships between components of the building;
generating, upon a triggering of the rule condition, analytic information associated with the triggered rule condition, wherein the analytic information is based on the ontology definition; and
displaying the analytic information associated with the triggered rule condition as part of a display of an operational environment of the building.

17. A computer implemented method for displaying information associated with an operation state of a building, comprising:
defining a rule condition for a building, wherein the rule condition is based on an ontology definition associated with the building;
generating, upon a triggering of the rule condition, analytic information associated with the triggered rule condition, wherein the analytic information is based on the ontology definition; and
displaying the analytic information associated with the triggered rule condition as part of a display of an operational environment of the building, wherein displaying the analytic information associated with the triggered rule condition as part of the display of the operational environment of the building includes overlaying the analytic information associated with the triggered rule condition on the display of the operational environment of the building.

18. A computer implemented method for displaying information associated with an operation state of a building, comprising:
defining a rule condition for a building, wherein the rule condition is based on an ontology definition associated with the building;
generating, upon a triggering of the rule condition, analytic information associated with the triggered rule condition, wherein the analytic information is based on the ontology definition; and
displaying the analytic information associated with the triggered rule condition as part of a display of an operational environment of the building, wherein the display of the operational environment of the building isolates a cost associated with the triggered rule condition.

19. A system for displaying information associated with an operation state of a building, comprising:
a rule engine having a number of rule conditions for a building, wherein the rule conditions are based on an ontology definition associated with the building and include a number of temperature rule conditions for an area of the building; and a computing device configured to:
  generate, upon a triggering of one of the rule conditions, analytic information associated with the triggered rule condition, wherein the analytic information is based on the ontology definition; and
  display, to a user of the computing device, the analytic information associated with the triggered rule condition as part of a display of an operational environment of the building provided to the user.

20. A system for displaying information associated with an operation state of a building, comprising:
  a rule engine having a number of rule conditions for a building, wherein the rule conditions are based on an ontology definition associated with the building; and
  a computing device configured to:
    generate, upon a triggering of one of the rule conditions, analytic information associated with the triggered rule condition, wherein the analytic information is based on the ontology definition;
    determine an importance of the analytic information associated with the triggered rule condition; and
    display, to a user of the computing device, the analytic information associated with the triggered rule condition, and the importance of the analytic information associated with the triggered rule condition, as part of a display of an operational environment of the building provided to the user.

21. A non-transitory computer readable medium having computer readable instructions stored thereon that are executable by a processor to:
  determine that a condition associated with a building has triggered a rule condition for the building, wherein the rule condition is based on an ontology definition associated with the building;
  generate, upon determining that the condition associated with the building has triggered the rule condition for the building, analytic information associated with the triggered rule condition, wherein:
    the analytic information is based on the ontology definition; and
    the analytic information includes temporal and spatial information associated with the triggered rule condition; and
  display the analytic information associated with the triggered rule condition as part of a display of an operational environment of the building, wherein the display of the operational environment of the building includes at least one of:
    an architectural layout of the operational environment;
    equipment in the operational environment; and
    an information panel that displays the analytic information associated with the triggered rule condition.

* * * * *